| United States Patent [19] | [11] | 3,879,301 |
|---|---|---|
| Cairns | [45] | Apr. 22, 1975 |

[54] LOW FRICTION BEARING MATERIAL AND METHOD

[75] Inventor: James W. Cairns, Cherry Hill, N.J.

[73] Assignee: Garlock Inc., Rochester, N.Y.

[22] Filed: July 12, 1973

[21] Appl. No.: 378,792

[52] U.S. Cl. .................................................. 252/12
[51] Int. Cl..... C10m 7/40; C01m 7/16; C10m 7/06
[58] Field of Search ........... 252/12, 12.2, 12.4, 12.6

[56] References Cited
UNITED STATES PATENTS

| 2,400,091 | 5/1946 | Alfthan | 252/12 |
|---|---|---|---|
| 2,400,099 | 5/1946 | Brubaker et al. | 252/12 |
| 2,998,397 | 8/1961 | Riesing | 252/12 |
| 3,122,505 | 2/1964 | Rulon-Miller et al. | 252/12 |
| 3,287,288 | 11/1966 | Reiling | 252/12 |
| 3,453,208 | 7/1969 | Gallagher et al. | 252/12.4 |
| 3,455,864 | 7/1969 | Dodson et al. | 252/12 |
| 3,592,783 | 7/1971 | Edmonds | 252/12 |
| 3,652,409 | 3/1972 | Mack et al. | 252/12 |
| 3,779,918 | 12/1973 | Ikeda et al. | 252/12 |
| 3,781,205 | 12/1973 | Cairns et al. | 252/12.4 |

*Primary Examiner*—Delbert E. Gantz
*Assistant Examiner*—I. Vaughn
*Attorney, Agent, or Firm*—Schovee & Boston

[57] ABSTRACT

A low friction bearing composition comprising a major portion of a thermoplastic resin other than polytetrafluoroethylene and a minor portion of a filled polytetrafluoroethylene material, said filled polytetrafluoroethylene material consisting essentially of at least 50 percent by volume of polytetrafluoroethylene polymer and the remainder being a filler material, said fillter material being selected from the group consisting of carbon, glass, asbestos, silica, zinc, cadmium, lead and the oxides thereof, bronze, molybdenum disulfide, tungsten disulfide, alumina, zirconia, titanium oxide, cupric oxide, boron nitride, kieselguhr and mixtures thereof. The composition is readily formed by injection molding or hot extrusion methods and exhibits wear resistance at room temperatures substantially equal to polytetrafluoroethylene compositions which are fabricated by cold forming and sintering techniques.

20 Claims, No Drawings

LOW FRICTION BEARING MATERIAL AND METHOD

BACKGROUND OF THE INVENTION

This invention relates to bearing materials and more particularly to an improved low friction bearing material and method and elements formed therefrom having excellent resistance to wear and which can be easily fabricated.

Bearing compositions containing as an element thereof a fluorocarbon resin, such as polytetrafluoroethylene (PTFE) polymers are known in the art to produce low friction bearing elements which, because of the presence of the fluorocarbon resin, normally require no other lubrication to provide a low friction surface between moving parts. Polytetrafluoroethylene resin, although classified as thermoplastic is difficult and expensive to fabricate. Customary methods of fabrication such as injection molding and melt extrusion, cannot be applied to polytetrafluoroethylene and generally solid shapes formed from polytetrafluoroethylene are fabricated by cold forming operations followed by sintering.

In an attempt to avoid the costly cold forming and sintering techniques, compositions have been developed which combine polytetrafluoroethylene and other more easily fabricated resins. The purpose of such compositions is to combine the low friction of polytetrafluoroethylene with the ease of fabrication of the resin with which it is combined. Examples of such compositions, which incorporate fluorocarbon resins, can be seen in U.S. Pat. Nos. 3,287,288, Relling and 2,998,397, Riesing. Although the compositions of Relling and Riesing can be used to produce low friction bearing elements by injection molding techniques, the finished bearing elements demonstrate poor wear characteristics and are, thus, not particularly suited for heavy duty application.

SUMMARY OF THE INVENTION

Accordingly, it is an object of this invention to provide a composition incorporating fluorocarbon resin and a method for forming the composition into bearing elements by economical production methods such as injection molding and melt extrusion.

It is another object of this invention to provide bearing elements which have low friction characteristics and the high wear resistance at room temperature of prior art polytetrafluoroethylene composites which previously could only be produced by cold compacting and sintering.

These and other objects and advantages of this invention will become apparent to those skilled in the art from consideration of the following disclosure and appended claims.

In accordance with the present invention a composition is provided comprising a major portion of a thermoplastic resin (for purposes of the present specification and claims, the term "thermoplastic resin" does not include PTFE) and a minor portion of a filled polytetrafluoroethylene material. The composition is readily fabricated into bearings by molding, hot extrusion or similar known processes. The composition of this invention can be used as a surface layer to form a low friction bearing surface over a supporting substrate as will be more fully described hereinafter.

Major portion, as used herein, means that the composition of this invention comprises at least 50% by volume of a thermoplastic resin. Minor portion, as used herein, means that the composition of the invention comprises not more than 50% by volume of filled, polytetrafluoroethylene material.

DESCRIPTION OF THE PREFERRED EMBODIMENTS

The major portion of the composition of this invention is a thermoplastic resin. The choice of thermoplastic resin is initially dependent on factors such as environment, cost of materials, equipment and the like, and by actual test of the friction and wear characteristics of the resin in combination with the other ingredients of the bearing composition.

Among the thermoplastic resin materials which can be utilized in the composition of the present invention are polyacrylate resins such as the various esters of acrylic acid and methacrylic acid incorporating monomers such as methylacrylate, ethylacrylate, propylacrylate, isopropylacrylate, and the like.

Likewise, other thermoplastic resins which are used to form the composition of this invention include the homopolymers and copolymers of polyester resins, polyolefin resins, phenoxy resins, polycarbonate resins, polyamide resins (nylon), polyimide resins, polysulfone resins, polyarylene sulfide resins and polyether resins and mixtures thereof.

These resins can be readily formed into shapes by injection molding, extrusion, and the like to form articles therefrom and in addition to this, have the necessary properties of chemical inertness, resistance to heat and the like which make them suitable for bearing materials. As mentioned above the selection of a particular resin is a matter of choice dependent on factors well known to those skilled in the art. These resins are available obtained commercially and are normally in the form of pellets or finely divided particles or powder.

The polyarylene sulfides are a preferred resin in the composition of this invention. Polyarylene sulfides are formed by the reaction of at least one polyhalosubstituted monocylic aromatic compound with an arylene metal sulfide. A highly preferred polyarylene sulfide is polyphenylene sulfide which is a crystalline polymer with a symmetrical, rigid back bone chain consisting of para-substituted benzene rings connected by a single sulfur atom between rings.

Another preferred resin in the composition of the invention is acetal, a polyether which is prepared by the polymerization of formaldehyde. In addition polyolefin resins such as polyethylene and polypropylene are preferred thermoplastic resins for use in the composition of this invention.

A minor portion of the bearing composition of this invention comprises filled polytetrafluoroethylene material. The form of the polytetrafluorethylene polymer in the filled polytetrafluoroethylene product is not critical and, accordingly, good results are achieved using virgin sintered polytetrafluorethylene resins, degraded polytetrafluorethylene resins or reprocessed or reground scrap polytetrafluorethylene. It is preferred to use the reprocessed or reground material since it materially reduces the cost of filled polytetrafluoroethylene material without a reduction in the desired properties of the finished bearing composition in accordance with this invention.

The filler portion of the filled polytetrafluoroethylene material may consist of a number of materials which are noted for their ability to provide wear resistance when combined with polytetrafluoroethylene. Among such filler materials are zinc, cadmium, lead and the oxides thereof, glass, bronze, carbon and graphite, molybdenum disulfide, tungsten disulfide, alumina, zirconia, titanium oxide, asbestos, silica, boron nitride, kieselguhr, cupric oxide or mixtures thereof. The selection of a particular filler material or particular combination of filler materials is to a large extent dependent upon the choice of thermoplastic resin to be used in the bearing composition and the compatability of the filler material with the thermoplastic resin and with the polytetrafluoroethylene polymer as well as the conditions to which the bearing will be exposed. Their primary function of creating or enhancing the wear resistance of the composition is measured by empirical testing and the final selection of fillers is normally made on the basis of such test results. For the purposes of illustrating the invention I have selected as the filler portion of the filled polytetrafluoroethylene material, a mixture of cadmium oxide and bronze.

In order to achieve the desired characteristics of low friction, high wear resistance and ease of moldability, the polytetrafluoroethylene filled material of this invention must contain at least 50 percent by volume but not more than about 95 percent by volume of polytetrafluoroethylene and between about 5 percent by volume and 50 percent by volume of the filler material. A preferred filled polytetrafluoroethylene material comprises about 80 percent by volume of polytetrafluoroethylene and about 20 percent by volume of filler material.

Filled polytetrafluoroethylene materials of a wide variety of compositions, are known in the art and are commercially available from various manufacturers such as Garlock Inc. whose filled polytetrafluoroethylene products are sold under the trade name "Multifil" or from the Liquid Nitrogen Processing Corporation. Generally the filled polytetrafluoroethylene materials are prepared by blending in dry powder form the polytetrafluoroethylene resin and the filler material to form a substantially homogenous blend of the polytetrafluoroethylene and the filler.

The novel composition of this invention is thus formed from the aforedescribed thermoplastic resin and the filled polytetrafluoroethylene material. The major portion of the bearing composition, that is at least 50 percent by volume, comprises the thermoplastic resin while the minor portion of the composition, that is less than 50 percent by volume, consists of the filled polytetrafluoroethylene material. Good results are obtained employing the composition of the invention having thermoplastic resin in proportion of about 75 percent to about 85 percent by volume and filled polytetrafluoroethylene material in proportions of about 15 to about 25 percent by volume.

The composition of this invention is preferably formed by dry blending the filled polytetrafluoroethylene material and the thermoplastic resin. It is preferred to first form a homogenous mixture by dry blending the filled polytetrafluoroethylene material and then adding the thermoplastic resin powder. However, the polytetrafluoroethylene, the filler and the injection moldable thermoplastic resin may be simultaneously blended to form the composition of this invention. Likewise, although it is preferred to deal with the bearing materials in dry powder form, it should be understood that the novel composition of this invention may be formed by dispersing the filled polytetrafluoroethylene material in a solution of the injection moldable thermoplastic resin in solvent or in the molten thermoplastic resin itself and removing the solvent or allowing the resin to harden and thereafter comminuting the resultant material, if necessary, to form particles of the moldable composition of this invention. For production quantities it has been found most desirable to form the composition of this invention by the addition of the polytetrafluoroethylene filled material to the thermoplastic resin by the means of a twin screw extruder which thoroughly hot mixes the materials and produces in pelletized form the composition of this invention which can be then subsequently molded into bearings.

In accordance with this invention it is highly preferred to form bearings from the novel composition by means of injection molding techniques well understood in the art. The composition formed in accordance with this invention provides a bearing composition which when fabricated provides a bearing surface having low coefficient of friction and an improved resistance to wear over prior art moldable or extrudable compositions. Moreover bearing elements made in accordance with this invention couple the foregoing improved bearing characteristics with the ease and economy of fabrication by injection molding or hot extrusion. The precise temperatures and molding pressures will depend, of course, on the particular thermoplastic resin used in the composition and the determination of molding temperatures and pressures is readily made by one skilled in the art.

Injection molding techniques provide an economical means to produce bearing elements and injection molding readily lends itself to large quantity production at relatively low costs. It is thus preferred to form unitary bearings by injection molding the composition of this invention. However, the composition of this invention may be utilized to produce composite bearings by forming a surface layer consisting of the composition of this invention over a substrate. For example, the bearing composition can be hot extruded directly on a substrate or can be first formed into a sheet or film which is subsequently bonded to the substrate. Such laminated composites are preferably produced in strip form which can then be formed into sleeve bearings or punched into various configurations such as thrust washers and the like. Conventionally used substrate materials such as steel, copper, bronze, rubber and the like can be employed and extrusion or bonding of the composition is carried out by means known to those skilled in the art.

The following examples are merely illustrative of the present invention and are not intended as a limitation upon the scope thereof.

EXAMPLE 1

Bearings, 1-3/16 OD × 1 inch ID × 1 inch long were prepared by injection molding at a temperature of 420°F and a pressure of 15,000 psi utilizing a bearing composition prepared in accordance with this invention. The bearing composition consisted of 77 percent by volume of acetal resin and 23 percent by volume of filled polytetrafluoroethylene material. The filled polytetrafluoroethylene material consisted of 83 percent by volume polytetrofluoroethylene, 13 percent by volume cadmium oxide and 4 percent by volume of bronze. This composition was formed by dry blending the acetal resin powder with the preblended, particulate polytetrafluoroethylene filled material to form a substantially homogenous mixture of the particles of acetal resin and the polytetrafluoroethylene filled material.

EXAMPLE 2

Bearings of the same size as in Example 1 were produced from another composition prepared according to the invention consisting of 75 percent by volume of polyphenylene sulfide (PPS) and 25 percent by volume of filled polytetrafluoroethylene material comprising 80 percent by volume polytetrafluoroethylene, 16 percent by volume cadmium oxide and 4 percent by volume of bronze. The bearing elements were injected molded as in Example 1 except that the molding temperature was 650°F.

EXAMPLE 3

For comparative testing bearings were formed from the acetal resin of Example 1 without filler, the acetal resin of Example 1 and filled with 23 percent by volume polytetrafluoroethylene and oil impregnated acetal resin employing the resin of Example 1. These bearing compositions were formed into bearings by injection molding at the same temperature and pressure as for the bearings formed in Example 1. Bearings were also formed by cold forming and sintering a filled polytetrafluoroethylene product which is known to possess a low coefficient of friction and high wear resistance. This product comprises a major portion of polytetrafluoroethylene and a minor portion of cadmium and bronze filler and is identified as Multifil 425, a Trademark of Garlock Inc.

EXAMPLE 4

The bearings produced in Examples 1-3 were tested by rotating the inner surfaces of the bearings continuously against a low carbon steel shaft provided with a 16 RMS finish. The bushing was subjected to a dead weight radial load. The load and speed were selected to give a PV, the product of the load and speed in PSI-FPM, of about 5,000. After a selected time interval of 25 hours the radial wear of the specimen was measured. The tests were continued for at least three additional time intervals on each of two specimens. The results shown are the average of the eight wear rates from two specimens and are reported as wear in inches × $10^{-4}/100$ HRS. of operation.

Tests were conducted at four different shaft speeds; 10 FPM, 50 FPM, 100 FPM and 500 FPM. The radial load was adjusted in each case to maintain a PV of 5000. It should be noted, however, that bearing elements composed of acetal resin alone and acetal resin plus polytetrafluoroethylene had to be tested at a reduced radial load so as to provide a PV of only 3000. At higher radial loads under the test conditions described above these bearings failed before the completion of the test interval and wear could not be measured at a PV of 5000.

The results of the test are summarized in Table A below:

TABLE A

Wear in inches × $10^{-4}/100$ HRS

| Bearing Composition | Shaft Speed | | | |
|---|---|---|---|---|
| | 10ft/min. | 50ft/min. | 100ft/min. | 500ft/min. |
| Cold Formed and sintered polytetrafluoroethylene product | 4 | 3 | 2 | 2 |
| Acetal Resin only. (Test conducted at PV 3,000, material would not test at 5,000 PV) | 55 | — | Erratic from 63 to 33 | 30 |
| Acetal + 23% by volume polytetrafluoroethylene (Test conducted at PV 3,000, material would not test at 5,000 PV) | 6 | 11 | 30 | 40 |
| Oil Filled Acetal | 7 | 10 | 65 | 14 |
| 75 Vol % Acetal + 25 Vol % Filled polytetrafluoroethylene Material | 2 | 3 | 4 | 2 |
| 77 Vol % PPS + 23 Vol % Filled polytetrafluoroethylene Material | 2 | 3 | 2 | 5 |

From the foregoing Table A it can be see that bearings produced in accordance with this invention have a substantially superior resistance to wear than do bearings produced from other types of injection moldable compositions which are representative of prior art bearing compositions. Moreover, bearings produced from compositions according to this invention exhibit wear resistance properties equal to the best prior art compositions which can only be formed by cold forming and sintering techniques.

While the foregoing constitutes a preferred composition in accordance with this invention, it should be understood that numerous changes and modifications are possible without departing from the scope of the invention, as will be claimed hereinafter.

What is claimed is:

1. A low friction bearing composition comprising a major portion of a thermoplastic resin other than polytetrafluoroethylene and a minor portion of a filled polytetrafluoroethylene material, said filled polytetrafluoroethylene material consisting essentially of at least 50 percent by volume of polytetrafluoroethylene polymer and the remainder being a filler material, said filler material being selected from the group consisting of carbon, glass, asbestos, silica, zinc, cadmium, lead and the oxides thereof, bronze, molybdenum disulfide, tungsten disulfide, alumina, zirconia, titanium oxide, cupric oxide, boron nitride, kieselguhr and mixtures thereof.

2. The composition of claim 1 wherein said thermoplastic resin comprises 75 percent by volume to about 85 percent by volume of said composition and said filled polytetrafluoroethylene material comprises 15 percent by volume to 25 percent by volume of said composition.

3. The composition of claim 1 wherein said thermoplastic resin is selected from the group consisting of polyacrylate resins, polyester resins, polyolefin resins, phenoxy resins, polycarbonate resins, polyamide resins, polyimide resins, polysulfone resins, polyarylsulfide resins, polyether resins and mixtures thereof.

4. The composition of claim 1 wherein said filled polytetrafluoroethylene material consists essentially of 50 percent by volume to 95 percent by volume of polytetrafluoroethylene and from 5 percent by volume to 50 percent by volume of filler material.

5. The composition of claim 4 wherein said filler material comprises cadmium oxide and bronze.

6. The composition of claim 1 comprising about 77 percent by volume of acetal resin and about 23 percent by volume of filled polytetrafluoroethylene material, said filled polytetrafluoroethylene material comprising about 83 percent by volume of polytetrafluoroethylene resin, about 13 percent by volume cadmium oxide and about 4 percent by volume of bronze.

7. The composition of claim 1 comprising about 75 percent by volume of polyphenylene sulfide resin and about 25 percent by volume of filled polytetrafluoroethylene material, said filled polytetrafluoroethylene material comprising about 80 percent by volume of polytetrafluoroethylene resin, about 16 percent by volume of cadmium oxide and about 4 percent by volume of bronze.

8. A low friction bearing element in which at least a bearing surface thereof comprises a substantially homogeneous mixture consisting essentially of a major portion of a thermoplastic resin other than polytetrafluoroethylene and a minor portion of filled polytetrafluoroethylene material, said filled polytetrafluoroethylene material comprising 50 percent by volume to 95 percent by volume of polytetrofluoroethylene polymer and from 5 percent by volume to 50 percent by volume of filler material, said filler material is selected from the group consisting of zinc, cadmium, lead and the oxides thereof, glass, bronze, carbon, graphite, molbdenum disulfide, tungston disulfide, alumina, zirconia, titanium oxide, asbestos, silica, boron nitride, kieselguhr, cupric oxide and mixtures thereof.

9. The low friction bearing element of claim 8 wherein said thermoplastic resin is selected from the group consisting of polyacrylate resins, polyester resins, polyolefin resins, phenoxy resins, polycarbonate resins, polyamide resins, polyimide resins, polysulfone resins, polyarylsulfide resins, polyether resins and mixtures thereof.

10. The low friction bearing element of claim 8 wherein at least said bearing surface consists essentially of about 75 percent by volume of polyphenylene sulfide resin and about 25 percent by volume of filled polytetrafluoroethylene material.

11. The low friction bearing element of claim 8 wherein at least said bearing surface consists essentially of about 77 percent by volume of acetal resin and about 23 percent by volume of filled polytetrafluoroethylene material.

12. The bearing element of claim 8 wherein said filler material consists essentially of a mixture of cadmium oxide and bronze.

13. A process for forming a bearing element wherein at least a bearing surface thereof is formed of a low friction material comprising the steps of forming a substantially homogenous blend consisting essentially of a major portion of a thermoplastic resin other than polytetrafluoroethylene and a minor portion of a filled polytetrafluoroethylene material, said filled polytetrafluoroethylene material comprising between 95 percent by volume and 50 percent by volume of polytetrafluoroethylene and between 5 percent by volume and 50 percent by volume of a filler, said filler material being selected from the group consisting of carbon, glass, asbestos, silica, zinc, cadmium, lead and the oxides thereof, bronze, molybdenum disulfide, tungsten disulfide, alumina, zirconia, titanium oxide, cupric oxide, boron nitride, kieselguhr and mixtures thereof subjecting said blend to heat to soften said resin and forming said blend while said resin is in the softened condition into at least a surface of said bearing element.

14. The process of claim 13 wherein said blend is injection molded to form a bearing element consisting essentially of said low friction material.

15. The process of claim 13 wherein said blend is extruded onto a substrate thereby to form a low friction surface on said substrate.

16. The process of claim 15 including the step of bonding said extruded blend onto said substrate.

17. A low friction bearing composition comprising more than 50 percent by volume of acetal resin and less than 50 percent by volume of filled polytetrafluoroethylene material, said filled PTFE material comprising at least 50 percent by volume of polytetrafluoroethylene polymer and the remainder being a filler material selected from the group consisting of carbon, glass, asbestos, silica, zinc, cadmium, lead and the oxides thereof, bronze, molybdenum disulfide, tungsten disulfide, alumina, zirconia, titanium oxide, cupric oxide, boron nitrite, kieselguhr and mixtures thereof.

18. The composition of claim 17 wherein said acetal resin comprises about 77 percent by volume and said filled polytetrafluoroethylene material comprises about 23 percent by volume and wherein said filled polytetrafluoroethylene material comprises about 83 percent by volume of polytetrafluoroethylene and the filler comprising cadmium oxide and bronze, with the cadmium oxide being at least 50 percent by volume of said filler.

19. A low friction bearing composition comprising more than 50 percent by volume of polyphenylene sulfide resin and less than 50 percent by volume of filled polytetrafluoroethylene material, said filled polytetrafluoroethylene material comprising at least 50 percent by volume of polytetrafluoroethylene polymer and the remainder being a filler material selected from the group consisting of carbon, glass, asbestos, silica, zinc, cadmium, lead and the oxides thereof, bronze, molybdenum disulfide, tungsten disulfide, alumina, zirconia, titanium ixide, cupric oxide, boron nitrite, kieselguhr and mixtures thereof.

20. The composition of claim 19 wherein said polyphenylene sulfide resin comprises about 75 percent by volume and said filled polytetrafluoroethylene material comprises about 25 percent by volume and wherein said filled polytetrafluoroethylene material comprises about 80 percent by volume of polytetrafluoroethylene and the filler comprising cadmium oxide and bronze, with the cadmium oxide being at least 50 percent by volume of said filler.

* * * * *

Disclaimer

3,879,301.—*James W. Cairns*, Cherry Hill, N.J. LOW FRICTION BEARING MATERIAL AND METHOD. Patent dated Apr. 22, 1975. Disclaimer filed June 17, 1980, by the assignee, *Garlock Inc.*

Hereby enters this disclaimer to claims 1–20 of said patent.

[*Official Gazette August 19, 1980.*]